(12) United States Patent
Jung et al.

(10) Patent No.: US 9,589,711 B2
(45) Date of Patent: Mar. 7, 2017

(54) RESISTOR AND MANUFACTURING METHOD THEREOF

(71) Applicant: SMART ELECTRONICS INC., Ulsan (KR)

(72) Inventors: Jong il Jung, Busan (KR); Doo Won Kang, Anyang-si (KR); Gyu Jin Ahn, Ulsan (KR); Sang Joon Jin, Busan (KR); Hyun Chang Kim, Ulsan (KR); Kyung Mi Lee, Ulsan (KR)

(73) Assignee: SMART ELECTRONICS INC., Ulsan (KR)

( * ) Notice: Subject to any disclaimer, the term of this patent is extended or adjusted under 35 U.S.C. 154(b) by 87 days.

(21) Appl. No.: 14/441,840

(22) PCT Filed: Nov. 7, 2013

(86) PCT No.: PCT/KR2013/010077
§ 371 (c)(1),
(2) Date: May 9, 2015

(87) PCT Pub. No.: WO2014/073883
PCT Pub. Date: May 15, 2014

(65) Prior Publication Data
US 2015/0287505 A1    Oct. 8, 2015

(30) Foreign Application Priority Data

Nov. 9, 2012  (KR) ........................ 10-2012-0126420

(51) Int. Cl.
*H01C 1/02*  (2006.01)
*H01C 1/024*  (2006.01)
(Continued)

(52) U.S. Cl.
CPC ........... *H01C 1/024* (2013.01); *B23K 1/0016* (2013.01); *B23K 1/19* (2013.01); *B23K 35/0222* (2013.01);
(Continued)

(58) Field of Classification Search
CPC ........ H01C 1/024; H01C 1/026; H01C 17/02; H01C 17/28
(Continued)

(56) References Cited

U.S. PATENT DOCUMENTS 3,199,058 A * 8/1965 Cramer ................. H01C 1/026
174/50.63
3,803,528 A * 4/1974 Wellard ................. H01C 1/148
338/237

(Continued)

FOREIGN PATENT DOCUMENTS

JP   62-076701 A   4/1987
JP   62-183543 A   8/1987
(Continued)

*Primary Examiner* — Kyung Lee
(74) *Attorney, Agent, or Firm* — Novick, Kim & Lee, PLLC; Jae Youn Kim

(57) ABSTRACT

A resistor and a manufacturing method thereof are disclosed. Since a ceramic tube formed of a ceramic material is used and the ceramic tube is joined to sealing electrodes by use of brazing rings, joining strength and durability of the resistor are considerably improved. The resistor may be stably used at a high voltage due to excellent heat dissipation characteristics thereof.

13 Claims, 9 Drawing Sheets

(51) Int. Cl.
*H01C 1/014* (2006.01)
*H01C 1/08* (2006.01)
*H01C 1/144* (2006.01)
*H01C 17/02* (2006.01)
*B23K 1/00* (2006.01)
*B23K 1/19* (2006.01)
*B23K 35/02* (2006.01)
*B23K 35/30* (2006.01)
*H01C 1/026* (2006.01)
*H01C 17/28* (2006.01)
*H01H 85/048* (2006.01)

(52) U.S. Cl.
CPC ......... *B23K 35/3006* (2013.01); *H01C 1/014* (2013.01); *H01C 1/026* (2013.01); *H01C 1/08* (2013.01); *H01C 1/144* (2013.01); *H01C 17/02* (2013.01); *H01C 17/28* (2013.01); *H01H 85/048* (2013.01)

(58) Field of Classification Search
USPC .................................. 338/272, 273, 274, 233
See application file for complete search history.

(56) References Cited

U.S. PATENT DOCUMENTS

| | | | | |
|---|---|---|---|---|
| 6,317,024 | B1* | 11/2001 | Orii | H01C 1/06 338/233 |
| 8,203,422 | B2* | 6/2012 | Naito | H01C 1/012 338/307 |
| 8,314,677 | B1* | 11/2012 | Kuo | H01C 1/14 338/264 |
| 8,400,253 | B2* | 3/2013 | Jung | H01H 69/02 337/182 |
| 2015/0287505 | A1* | 10/2015 | Jung | H01C 17/02 338/272 |

FOREIGN PATENT DOCUMENTS

| | | |
|---|---|---|
| JP | 02-305409 X2 | 12/1990 |
| JP | 06-224011 A | 8/1994 |
| JP | 07-312304 A | 11/1995 |
| JP | 09-022802 A | 1/1997 |
| JP | 2012-524968 A | 10/2012 |
| KR | 1999-0040562 A | 6/1999 |
| KR | 2001-0008915 A | 2/2001 |
| KR | 10-0797009 B1 | 1/2008 |
| KR | 10-2009-0030127 A | 3/2009 |

* cited by examiner (a)

(b)

RESISTOR AND MANUFACTURING METHOD THEREOF

BACKGROUND OF THE INVENTION

Field of the Invention

The present invention relates to a resistor and a manufacturing method thereof, and more particularly to a resistor having improved joining strength and durability, since a ceramic tube formed of a ceramic material is used and the ceramic tube is joined to sealing electrodes by use of brazing rings, and stably used at a high voltage due to excellent heat dissipation characteristics, and a manufacturing method thereof.

Description of the Related Art

In general, a resistor that is used in a circuit to restrict the flow of current causing a drop in voltage is a device consuming power to produce heat. A maximum power consumed thereby is set as the rated power. Resistors commonly used in electronic circuits have a power rating of about ⅛ to about ½ W, and resistors with a high power rating are used in power supplies.

FIG. 10 is a sectional view illustrating a conventional resistor. The conventional resistor includes a coil 2 wound on a cylindrical body 1 formed of glass fiber and having a predetermined length, cap bodies 3 disposed at both ends of the cylindrical body 1 provided with the coil 2 wound thereon and formed of a conductive material, and lead wires 4 connected to the cap bodies 3. In addition, both ends of the coil 2 are electrically connected to each of the cap bodies 3.

Then, the coil 2 and the cylindrical body 1 are coated with various colored synthetic resins indicating predetermined standards, and the resistor is commercialized. The resistor having the above described structure may be used in an electronic circuit when the lead wires 4 are inserted into slots of a printed circuit board in a fixed state.

Meanwhile, Korean Patent Application Publication No. 1999-0040562 discloses a coated parallel resistor including a first coil and a second coil.

However, power greater than the rated power supplied to conventional resistors generally causes deterioration in the resistors due to heat, thereby causing damage thereto. In particular, carbon resistors are easily damaged by heat, brining damages to electronic circuits. In addition, as ambient temperature of the resistor increases, heating of a resistive body needs to be reduced. Thus, the resistor needs to be used at a lower power than the rated power. As resistance increases, noise generated in the resistive body increases. In order to obtain high resistance while generating low noise, a fine coil needs to be wound or a thin metal film needs to be. However, in this case, a cut-off may easily occur.

SUMMARY OF THE INVENTION

Therefore, the present invention has been made in view of the above problems, and it is an object of the present invention to provide a resistor having improved joining strength and durability, since a ceramic tube formed of a ceramic material is used, and the ceramic tube is joined to sealing electrodes by use of brazing rings, and stably used at a high voltage, and a method of manufacturing the resistor.

It is another object of the present invention to provide a resistor having excellent heat dissipation characteristics and stably used at a high rated voltage by reducing influence by ambient temperature, since heat generated in the resistive element is dissipated via sealing electrodes, the resistive element is disposed in the sealed ceramic tube, and the resistive element is surrounded by air or an inert gas filled in the ceramic tube, and a method of manufacturing the resistor.

It is a further object of the present invention to provide a resistor capable of improving wetting properties and joining strength of brazing rings by forming a plating layer at brazing junction regions, and a method of manufacturing the resistor.

In accordance with the present invention, the above and other objects can be accomplished by the provision of a resistor including a ceramic tube, a pair of sealing electrodes disposed at both ends of the ceramic tube and respectively electrically connected to lead wires, a resistive element accommodated in the ceramic tube to be electrically connected to the sealing electrodes and including a resistive body, terminal electrodes disposed at both ends of the resistive body, and a resistive layer electrically connected to the terminal electrodes, and brazing rings sealing between the ceramic tube and each of the sealing electrodes. In this regard, the ceramic tube is joined to the sealing electrodes by melting of the brazing rings.

The resistive body may have a rod shape and may be formed of a ceramic material, and the resistive layer may be formed by winding a coil on the outer circumferential surface of the resistive body or by forming a conductive layer on the outer circumferential surface of the resistive body and spirally cutting the conductive layer.

The brazing ring may include an alloy including copper (Cu), silver (Ag), and zinc (Zn).

Each of the sealing electrodes may include a contact portion protruding toward the inside of the ceramic tube to be inserted into the ceramic tube and contact the resistive element and a junction portion joined to the brazing ring.

An outer surface of the brazing ring may be disposed at the same line of an outer surface of the ceramic tube, and an inner surface of the brazing ring may be disposed to extend toward the inside of the ceramic tube to a portion farther inward than an inner edge of the ceramic tube.

The brazing ring may include an outer circumferential portion joined to the ceramic tube and an inner circumferential portion joined to an end portion of the resistive element.

The resistor may further include brazing members melted between the contact portion and each of the terminal electrodes to join the contact portion to the terminal electrode.

The resistor may further include a plating layer including nickel (Ni) or titanium (Ti) disposed on at least one selected from the group consisting of the contact portion, the junction portion, and the terminal electrode to improve joining strength by melting of the brazing ring or the brazing member.

In accordance with an aspect of the present invention, the above and other objects can be accomplished by the provision of a method of manufacturing a resistor including preparing the first sealing electrode, sequentially stacking the first brazing ring and the ceramic tube on the first sealing electrode, inserting the resistive element into the ceramic tube, sequentially stacking the second brazing ring and the second sealing electrode on the ceramic tube, and sealing between the ceramic tube and each of the first and second sealing electrodes by placing the resultant structure in a chamber and melting the first and second brazing rings. In this regard, the resistor includes a ceramic tube accommodating a resistive element, first and second sealing electrodes disposed at both ends of the ceramic tube to be connected to the resistive element, and first and second brazing rings joining the ceramic tube to each of the sealing electrodes.

Each of the first and second sealing electrodes may include a contact portion protruding toward the inside of the ceramic tube to be inserted into the ceramic tube and contact the resistive element and a junction portion joined to each of the first and second brazing rings, and each of the first and second brazing rings may be inserted to the junction portion of each of the first and second sealing electrodes.

The first and second brazing rings may be formed of $Ag_{25}CuZnSn$, an alloy including silver (Ag), copper (Cu), zinc (Zn), and tin (Sn), and the sealing may be performed by melting the first and second brazing rings at a temperature of 500 to 850.

A plating layer including nickel (Ni) or titanium (Ti) may further be disposed on the surface of the junction portion to improve joining strength by melting of the first and second brazing rings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described with reference to the accompanying drawings.

When it is determined that a detailed description of the related art may unnecessarily obscure the subject matter of the present invention, the description thereof will be omitted. Further, the following terms, which are defined in consideration of functions of the present invention, may be altered depending on the user's intentions or judicial precedents. Therefore, the meaning of each term should be interpreted based on the entire disclosure of the specification.

Figure 1A:
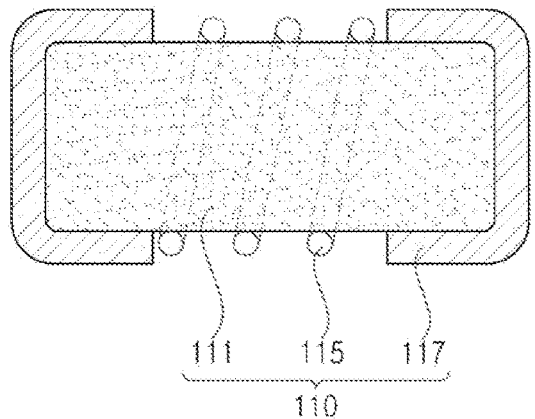
FIGS. 1A and 1B are sectional views illustrating resistive elements according to the present invention.
Figure 1B:
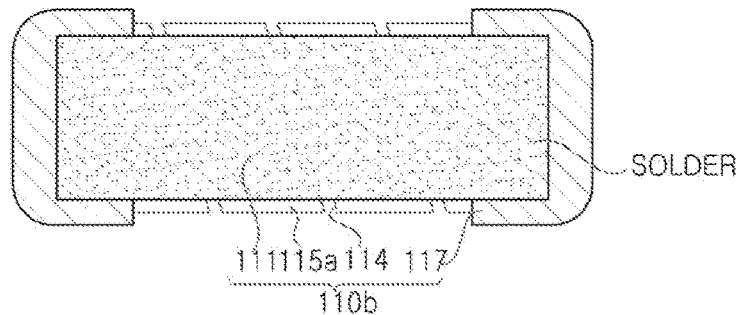
Figure 2:
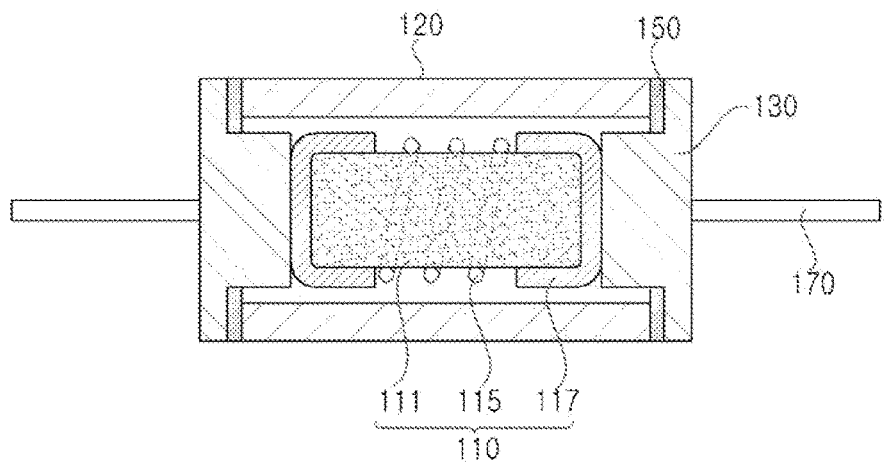
FIG. 2 is a sectional view illustrating a resistor according to a first embodiment of the present invention.
Figure 3:
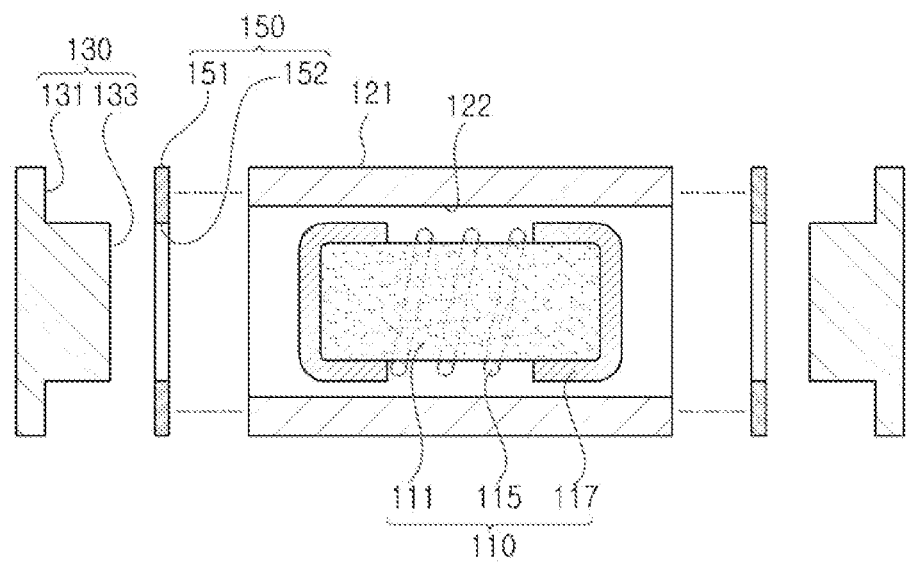
FIG. 3 is an exploded sectional view illustrating the resistor according to the first embodiment of the present invention.

FIGS. 1A and 1B are sectional views illustrating resistive elements according to the present invention. FIG. 2 is a sectional view illustrating a resistor according to a first embodiment of the present invention. FIG. 3 is an exploded sectional view illustrating the resistor according to the first embodiment of the present invention.

As illustrated in FIGS. 1A to 3, a resistor 100 according to the present invention generally includes a ceramic tube 120, sealing electrodes 130, a resistive element 110, and brazing rings 150.

Specifically, the resistor 100 according to the present invention includes a ceramic tube 120, a pair of sealing electrodes 130, which are disposed at both ends of the ceramic tube 120 and respectively electrically connected to lead wires 170, a resistive element 110, which is accommodated in the ceramic tube 120, which is electrically connected to the sealing electrodes 130, and has a resistant layer 115, and brazing rings 150 which seal between the ceramic tube 120 and each of the sealing electrodes 130.

Referring to FIG. 1A, the resistive element 110 according to the present invention may include a resistive body 111, terminal electrodes 117 disposed at both ends of the resistive body 111, and a resistive layer 115 electrically connected to the terminal electrodes 117 and having a predetermined resistance.

The resistive body 111 may have a rod shape and may be formed of a ceramic material such as alumina. In addition, the resistive layer 115 is formed on the outer circumferential surface of the resistive body 111.

The resistive layer 115 may be formed by spirally winding a coil on the outer circumferential surface of the resistive body 111.

In addition, the resistive layer 115 may be formed of copper (Cu), silver (Ag), an copper-silver alloy, a nickel-copper alloy, a nickel-iron alloy, copper surface-coated with silver, iron (Fe), chromium (Cr), and an iron-based alloy containing nickel as a main component.

For example, the terminal electrodes 117 may be formed of a copper alloy. The terminal electrodes 117 may be disposed at both ends of the resistive body 111 to electrically connect each of the sealing electrodes 130 with the resistive element 110.

In addition, referring to FIG. 1B, a resistive element 110b according to the present invention may include a resistive body 111, terminal electrodes 177 disposed at both ends of the resistive body 111, and a resistive layer 115b electrically connected to the terminal electrodes 117 and having a predetermined resistance.

The resistive layer 115b may be formed by forming a conductive layer on the outer circumferential surface of the resistive body 111 and spirally cutting the conductive layer.

As described above, the resistive elements 110 and 100a according to the present invention may be formed in various shapes, taking into consideration use and characteristics of products.

The ceramic tube 120 according to the present invention has a cylindrical shape and is formed of a ceramic material. The cylindrical ceramic tube 120 is provided with the sealing electrodes 130 at both ends. In addition, both ends of the ceramic tube 120 are joined to each of the sealing electrodes 130 by brazing junctions.

The sealing electrodes 130 are installed at both ends of the ceramic tube 120 as described above to be respectively electrically connected to the lead wires 170.

In addition, for example, the sealing electrodes 130 may be formed of a copper alloy.

For example, each of the sealing electrodes 130 may include a contact portion 133 that protrudes toward the inside of the ceramic tube 120 to be inserted into the ceramic tube 120 and contact the resistive element 110 and a junction portion 131 joined to the brazing ring 150.

Since the contact portion 133 of the sealing electrode 130 protrudes inward, the sealing electrode 130 may be efficiently assembled with the brazing ring 150 or the ceramic tube 120. Since the resistive element 110 contained in the ceramic tube 120 may be pressed during a brazing process, electrical connection between the sealing electrode 130 and the contact portion 133 may be improved.

The brazing ring 150 according to the present invention, as a filler metal, is melted between the ceramic tube 120 and each of the sealing electrodes 130 which are base metals to join the ceramic tube 120 to the sealing electrodes 130 in a sealed state.

For example, the brazing ring 150 may be formed of an alloy including copper (Cu), silver (Ag), and zinc (Zn).

In addition, the brazing process is performed at a temperature higher than a melting point of the brazing ring 150, as a filler metal, and lower than melting points of the ceramic tube 120 and the sealing electrodes 130, as base metals.

Wetting properties that indicate the degree of affinity between a filler metal and a base metal are an important factor in a brazing junction. That is, when the brazing ring has poor wetting properties with the ceramic tube 120 and the sealing electrodes 130, a junction therebetween cannot be formed. Thus, according to the present invention, a ceramic material having excellent wetting properties with the filler metal is used to form the ceramic tube 120 that accommodates the resistive element 110 instead of a glass material having poor wetting properties with the filler metal.

In addition, the brazing junction using the brazing ring 150 may provide high joining strength since the brazing ring 150 generates capillary action on the surfaces of the ceramic tube 120 and the sealing electrodes 130 while being melted and provide excellent resistance against impact such as vibration or the like.

Meanwhile, an outer surface 151 of the brazing ring 150 is disposed at the same level of an outer surface of the ceramic tube 120, and an inner surface 152 of the brazing ring 150 is disposed to extend toward the inside of the ceramic tube 120 to a portion farther inward than an inner edge of the ceramic tube 120.

As described above, the resistor 100 according to the present invention may have excellent durability and may be stably used at a high temperature since the ceramic tube 120 is formed of a ceramic material with excellent mechanical strength, and the ceramic tube 120 is joined to each of the sealing electrodes 130 by use of the brazing rings.

Figure 4:
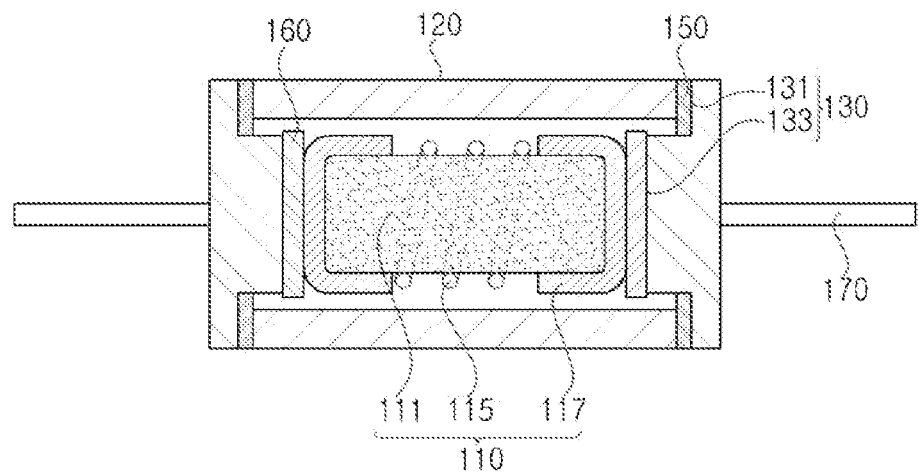
FIG. 4 is a sectional view illustrating a resistor according to a second embodiment of the present invention.

FIG. 4 is a sectional view illustrating a resistor 100a according to a second embodiment of the present invention.

Referring to FIG. 4, the resistor 100a according to the present invention may further include brazing members 160 that join each of the contact portions 133 to each of the terminal electrodes 117.

For example, the brazing member 160 may have a plate shape and may be formed of an alloy including copper (Cu), silver (Ag), and zinc (Zn).

The brazing member 160 is melted between the contact portion 133 and the terminal electrode 117 to join the contact portion 133 to the terminal electrode 117 in the same manner as the brazing ring 150.

Thus, the resistive element 110 may be more firmly joined to the sealing electrodes 130 by use of the brazing members 160, thereby improving durability of the resistor 100a.

Figure 5:
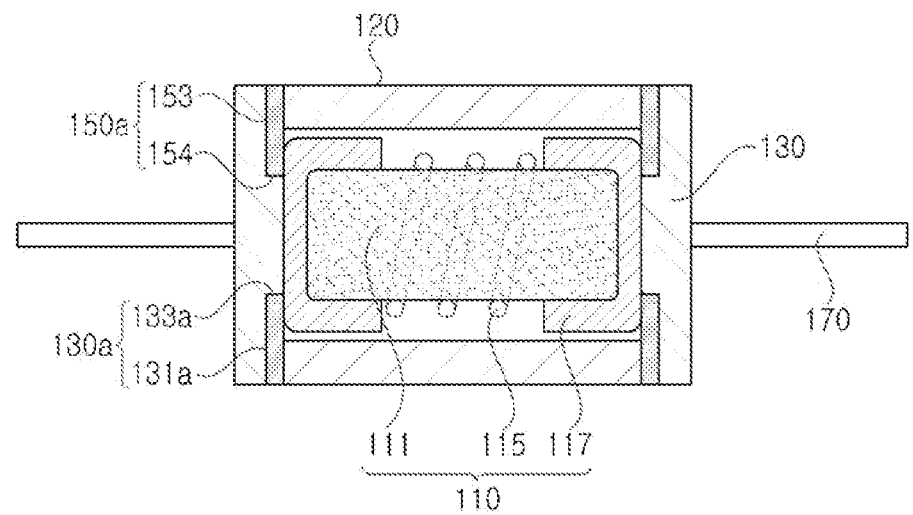
FIG. 5 is a sectional view illustrating a resistor according to a third embodiment of the present invention.

FIG. 5 is a sectional view illustrating a resistor 100b according to a third embodiment of the present invention.

Referring to FIG. 5, each of the brazing rings 150a of the resistor 100b according to the present invention may be configured to be joined to both of the ceramic tube 120 and the resistive element 110.

That is, the brazing ring 150a may include an outer portion 153 that is joined to an end of the ceramic tube 120 and an inner portion 154 that is joined to an end portion of the resistive element 110, particularly, the terminal electrode 117.

Thus, the brazing ring 150a may have a thickness identical to or greater than that of the contact portion 133a. This is because, when the thickness of the brazing ring 150a is greater than that of the contact portion 133a, the brazing ring 150a may be joined to both the ceramic tube 120 and the terminal electrode 117 after being melted.

In addition, the inner portion 154 of the brazing ring 150a may be formed to extend inward to a portion farther inward than that of the brazing ring 150 of FIG. 2, and the contact portion 133a may have a narrower width than the contact portion 133 of FIG. 2.

Figure 6:
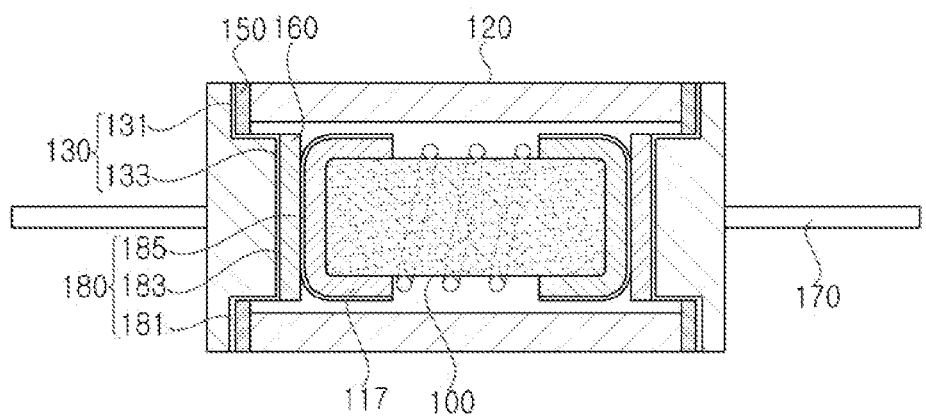
FIG. 6 is a sectional view illustrating a resistor according to a fourth embodiment of the present invention.

FIG. 6 is a sectional view illustrating a resistor 100c according to a fourth embodiment of the present invention.

Referring to FIG. 6, the resistor 100c according to the present invention may further include a plating layer 180 in order to improve wetting properties of the brazing ring 150 or the brazing member 160 with base metals.

In particular, the plating layer 180 (181,183, and 185) is formed on at least one of the contact portion 133, the junction portion 131, and the terminal electrode 117 to improve joining strength of the brazing ring 150 or the brazing member 160 by a melting process.

In addition, the plating layer 180 may include nickel (Ni) or titanium (Ti), and may be formed of, for example, a compound such as $Ni_3P$.

Figure 7A:
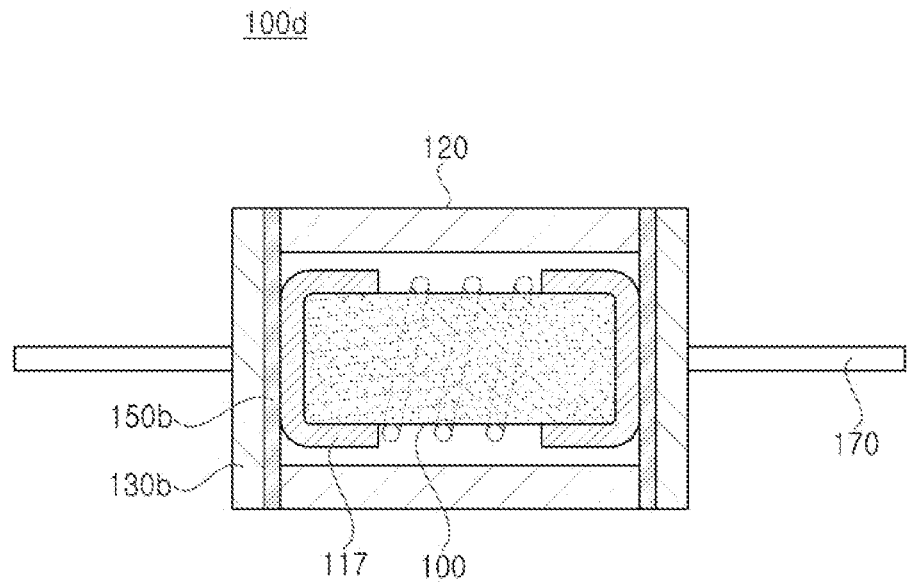
FIGS. 7A and 7B are sectional views illustrating a resistor according to a fifth embodiment of the present invention.
Figure 7B:
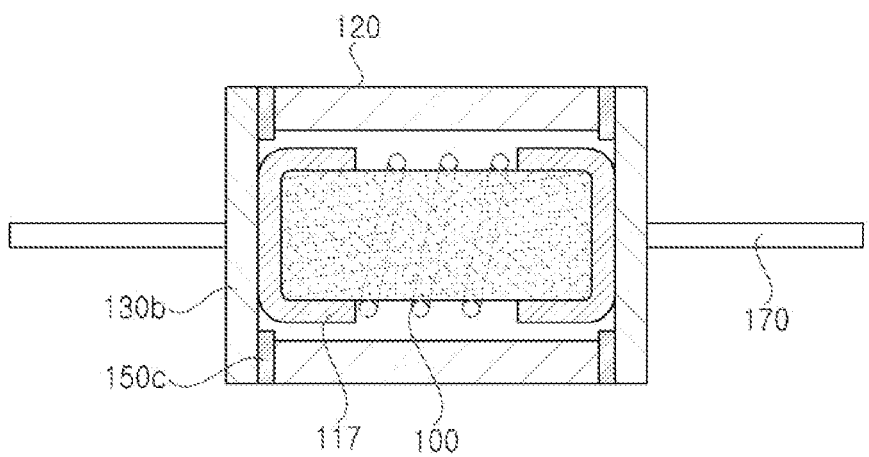

FIGS. 7A and 7B are sectional views illustrating a resistor 100d according to a fifth embodiment of the present invention.

Referring to FIGS. 7A and 7B, each of the sealing electrodes 130b according to the present invention may have a flat panel shape without having a protruding contact portion which is different from the sealing electrodes illustrated in FIGS. 1 to 6.

In addition, a brazing ring 150b may have a flat panel shape so as to be joined to one end of the ceramic tube 120 and one terminal electrode 117 at the same time (FIG. 7A).

In addition, a brazing ring 150c may have a hollow ring shape such that the sealing electrode 130b directly contacts the terminal electrode 117 (FIG. 7B).

Hereinafter, a method of manufacturing a resistor according to the present invention will be described in detail.

FIGS. 8A to 8F are sectional views for describing a method of manufacturing a resistor 100 according an embodiment of the present invention.

As described above, the resistor 100 manufactured by the method according to the present invention may include a ceramic tube 120 in which a resistive element 110 is accommodated, first and second sealing electrodes 130 and 135 respectively inserted into both ends of the ceramic tube 120 to be connected to the resistive element 110, and first and second brazing rings 150 and 155 respectively joining the ceramic tube 120 to each of the first and second sealing electrodes 130 and 135.

Figure 8A:
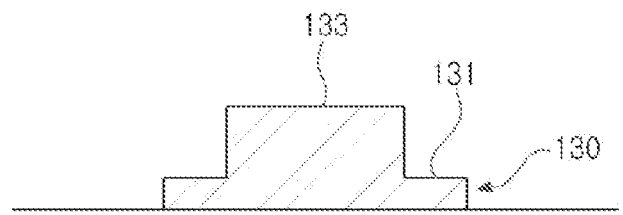
FIGS. 8A to 8F are sectional views for describing a method of manufacturing a resistor according an embodiment of the present invention.

First, referring to FIG. 8A, the first sealing electrode 130 is formed in operation S1. The first sealing electrode 130 includes a contact portion 133 that protrudes toward the inside of the ceramic tube 120 to be inserted into the ceramic tube 120 and contact the resistive element 110 and a junction portion 131 joined to the first brazing ring 150.

Figure 8B:
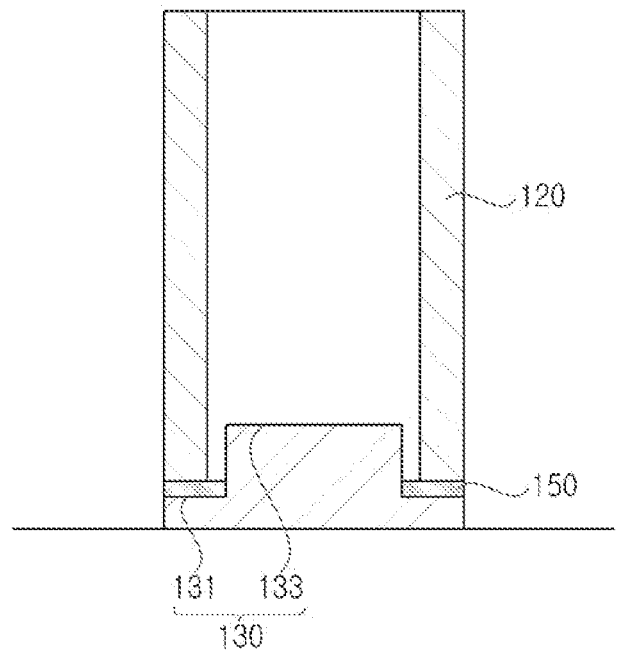

Then, referring to FIG. 8B, the first brazing ring 150 and the ceramic tube 120 are sequentially stacked on the first sealing electrode 130 in operation S2.

The first brazing ring 150 is mounted on the junction portion 131 of the first sealing electrode 130, and the ceramic tube 120 is disposed on the first brazing ring 150.

Figure 8C:
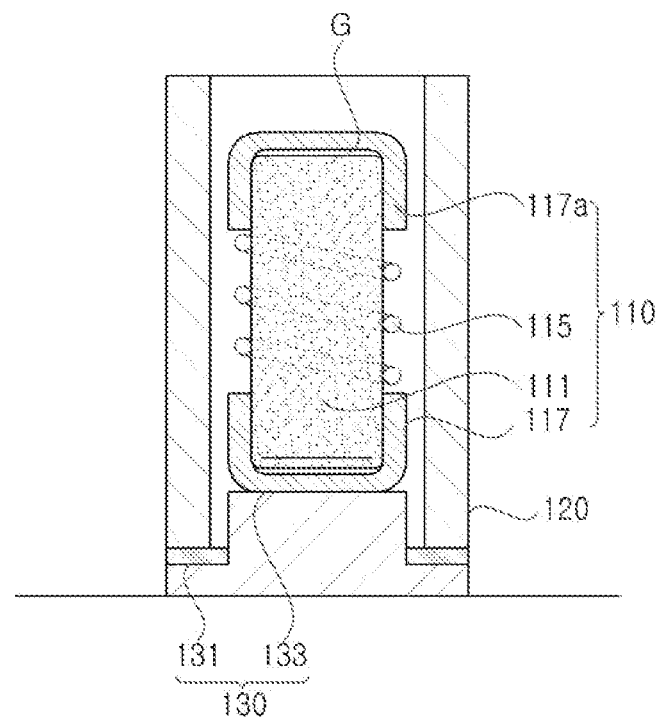

Then, referring to FIG. 8C, the resistive element 110 is inserted into the ceramic tube 120 in operation S3.

In this regard, the resistive element 110 may include a resistive body 111, first and second terminal electrodes 117 and 117a disposed at both ends of the resistive body 111, and a resistive layer 115 electrically connected to the first and second terminal electrodes 117 and 117a.

The first terminal electrode 117 of the inserted resistive element 110 is disposed on an upper surface of the contact portion 133 of the first sealing electrode 130. A gap G or space may be formed between an inner surface of the first terminal electrode 117 and the resistive body 111. The gap G or space may be eliminated by pressure applied thereto when the second sealing electrode 135 is joined thereto which will be described later and by a brazing process described in operation S5. The gap G or space may be naturally or artificially formed during assembly of the resistive element 110.

Figure 8D:
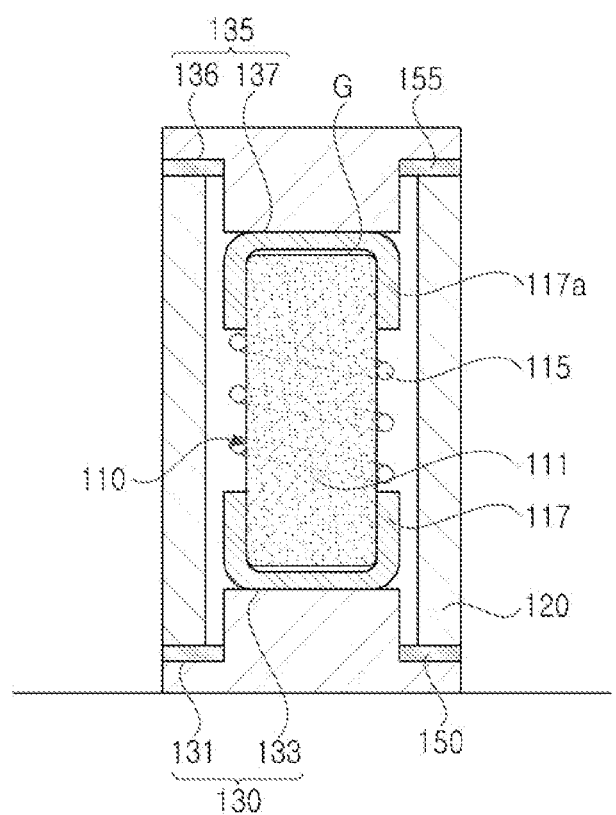

Then, referring to FIG. 8D, the second brazing ring 155 and the second sealing electrode 135 are sequentially stacked on the ceramic tube 120 in operation S4.

The resistor 100 is assembled through operation S1 to operation S4 to be a state before the brazing junction.

Then, the resistor 100 that has undergone operation S1 to operation S4 is placed in a chamber C, and the ceramic tube 120 and each of the first and second sealing electrodes 130 and 135 are sealed by melting the first and second brazing rings 150 and 155 in operation S5.

Operation S5 may be performed in the chamber C under an inert gas atmosphere, and the inside of the sealed ceramic tube 120 is filled with an inert gas. In addition, the inert gas functions to prevent oxidation of the resistive element 110 and improve durability.

Figure 8E:
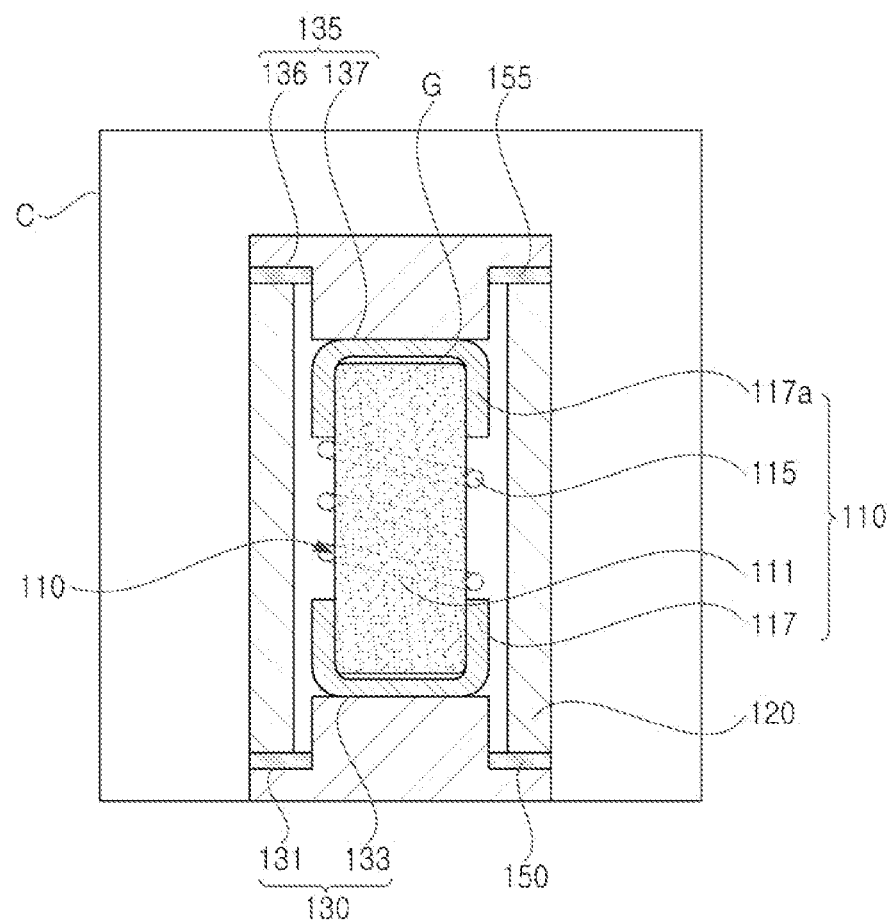
Figure 8F:
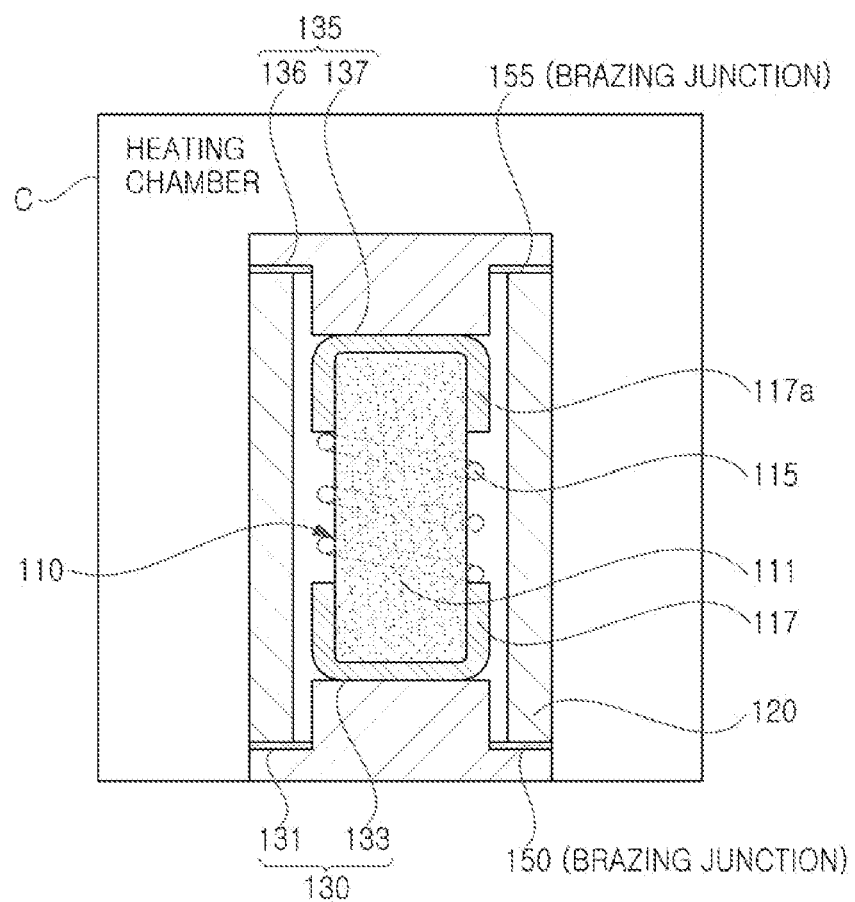

The resistor 100 is vertically added to the chamber C in a longitudinal direction (FIG. 8E). The chamber C is heated to melt the first and second brazing rings 150 and 155, thereby completing junction (FIG. 8F).

In this regard, the chamber C is heated at a temperature less than melting points of the first and second sealing electrodes 130 and 135 and the ceramic tube 120 which are base metals in order to prevent deformation of the base metals. The heating temperature may be adjusted in the range of 500 to 850 according to the material of the first and second brazing rings 150 and 155. For example, when the first and second brazing rings 150 and 155 are formed of an alloy including copper (Cu) and silver (Ag), e.g., $Ag_{25}Cu$, the chamber C may be heated to a temperature of 800 to 850. In this regard, the resistive layer 115 may be formed of a material that is not blown after brazing, for example, a nickel-copper alloy and a nickel-iron alloy.

In addition, when the first and second brazing rings 150 and 155 are formed of an alloy including silver (Ag), copper (Cu), zinc (Zn), and tin (Sn), e.g., $Ag_{56}CuZnSn$, the brazing is performed at a temperature of 600 to 650. Thus, the resistive layer 115 may be also formed of copper (Cu), silver (Ag), and a silver-copper alloy which are blown at a temperature of 800 to 850 as well as the nickel-copper alloy and the nickel-iron alloy.

That is, by reducing the brazing temperature where the first and second brazing rings 150 and 155 are melted from the range of 800 to 850 to the range of 600 to 650, main components of conventional resistive layers such as copper (Cu), silver (Ag), a silver-copper alloy, and the like may be used. Accordingly, there is a wide range of choices in designing resistors. In addition, at a temperature of 800 or greater, the fusible element 115 may be deteriorated by heat even though it is not blown out. However, when the brazing process is performed at a relatively lower temperature of 600 to 650, degradation of performance and quality by heat may be reduced.

Meanwhile, the heated first and second brazing rings 150 and 155 are melted to join the surfaces of base metals in a sealed state through capillary action, thereby decreasing in thickness. Then, lead wires are connected to outer surfaces of the sealing electrodes, thereby completing manufacture of the resistor 100.

Figure 9:
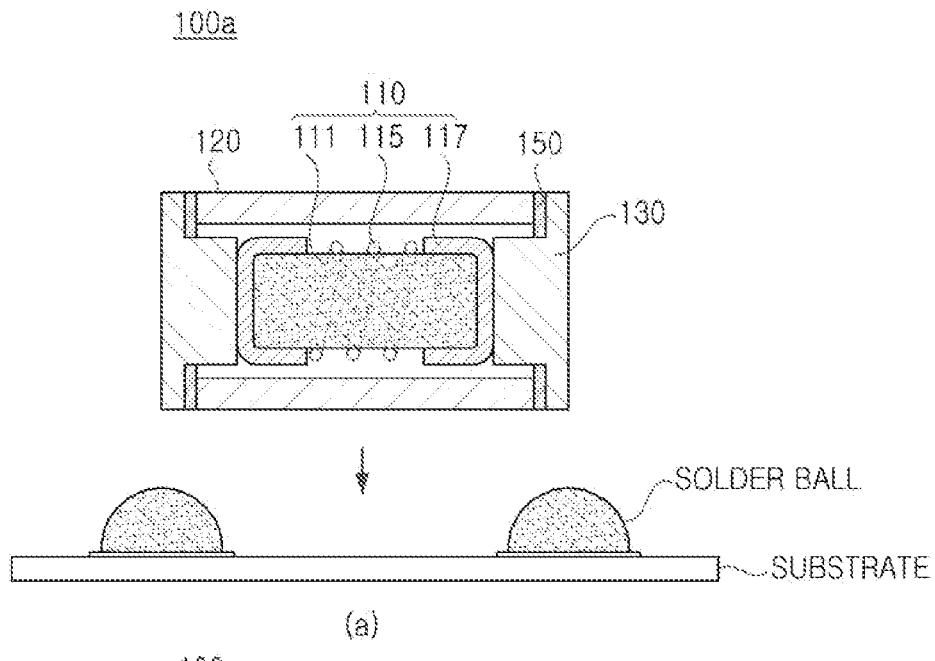
FIG. 9 is a sectional view illustrating a resistor according to the present invention mounted on a surface of a substrate.
Figure 9:
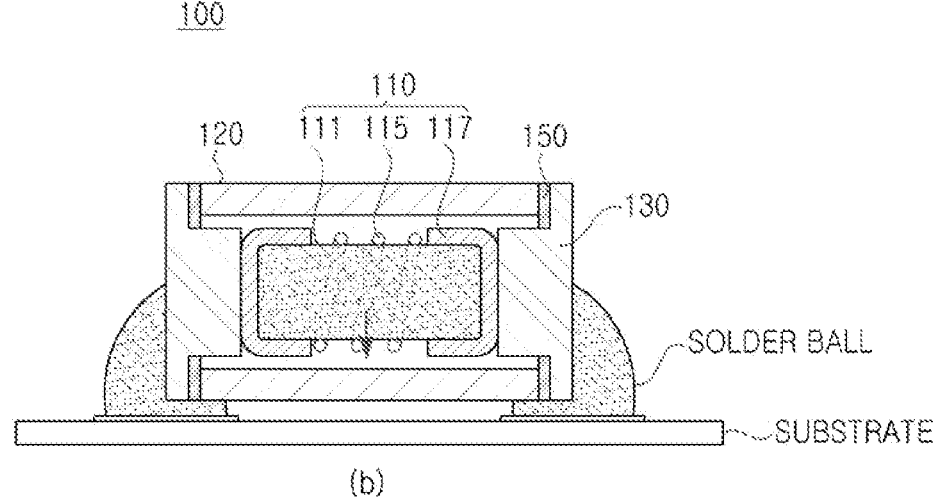
Figure 10:
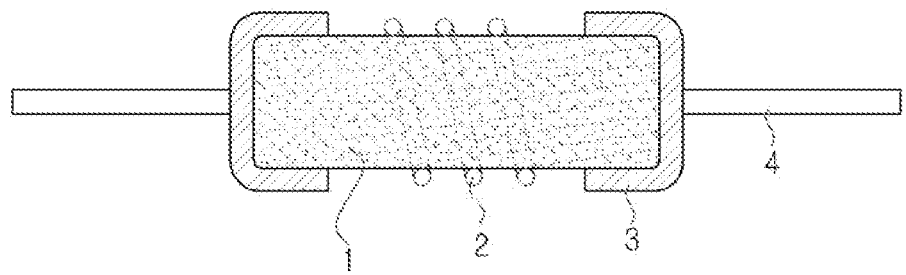
FIG. 10 is a sectional view illustrating a structure of a conventional resistor.

Meanwhile, FIG. 9 is a sectional view illustrating a resistor 100a according to the present invention mounted on a surface of a substrate.

Referring to FIG. 9, lead wires may be omitted, and the sealing electrodes 130 may be joined to solder balls in the resistor 100a according to the present invention. Thus, the resistor 100a may be used as a surface mount device (SMD).

As described above, according to the method of manufacturing the resistor, a ceramic tube formed of a ceramic material with excellent mechanical strength is used, and the ceramic tube is joined to the sealing electrodes by use of the brazing rings, and thus joining strength and durability of the resistor are improved. Thus, the resistor may be stably used at a high voltage.

In addition, since heat generated in the resistive element is dissipated via the sealing electrodes, the resistive element is disposed in the sealed ceramic tube, and the restive element is surrounded by air or an inert gas filled in the ceramic tube, influence of ambient temperature on the resistor is reduced. As such, since the resistor according to the present invention has excellent heat dissipation characteristics, it may be used at a high rated voltage.

In addition, by reducing the temperature of the brazing process to the range of 600 to 650, the resistive layer is not blown out even though conventional materials are used. A resistor having a relatively thin and long resistive layer and a high resistance may be manufactured.

As a result, according to the resistor and the manufacturing method thereof according to the present invention, a resistor stably used at a high voltage since durability is improved by the brazing process and heat dissipation characteristics are improved may be manufactured.

As is apparent from the above description, according to the resistor and the manufacturing method thereof according to the present invention, the resistor may have improved joining strength and durability and may be stably used at a high temperature since the ceramic tube formed of a ceramic material is used, and the ceramic tube is joined to the sealing electrodes by use of the brazing rings.

In addition, according to the resistor and the manufacturing method thereof according to the present invention, heat generated in the resistive element is dissipated via the sealing electrodes, the resistive element is disposed in the sealed ceramic tube, and the resistive element is surrounded by air or an inert gas filled in the ceramic tube, and thus influence of ambient temperature on the resistor may be reduced. Accordingly, the resistor may have excellent heat dissipation characteristics and may be used at a high rated voltage.

In addition, according to the resistor and the manufacturing method thereof according to the present invention, a plating layer is formed at brazing junction regions, wetting properties and joining strength of the brazing rings may further be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A resistor comprising:
a ceramic tube;
a pair of sealing electrodes disposed at both ends of the ceramic tube and respectively electrically connected to lead wires;
a resistive element accommodated in the ceramic tube to be electrically connected to the pair of sealing electrodes and comprising a resistive body, terminal electrodes disposed at both ends of the resistive body, and a resistive layer electrically connected to the terminal electrodes; and
brazing rings sealing between the ceramic tube and each of the pair of sealing electrodes,
wherein the ceramic tube is joined to the pair of sealing electrodes by melting of the brazing rings.

2. The resistor according to claim 1, wherein:
the resistive body has a rod shape and is formed of a ceramic material; and
the resistive layer is formed by winding a coil on the outer circumferential surface of the resistive body or by forming a conductive layer on the outer circumferential surface of the resistive body and spirally cutting the conductive layer.

3. The resistor according to claim 1, wherein the each of brazing rings comprises an alloy comprising copper (Cu), silver (Ag), and zinc (Zn).

4. The resistor according to claim 1, wherein each of the pair of sealing electrodes comprises a contact portion protruding toward the inside of the ceramic tube to be inserted into the ceramic tube and contact the resistive element and a junction portion joined to each of the brazing rings.

5. The resistor according to claim 4, wherein an outer surface of each of the brazing rings is disposed at the same level of an outer surface of the ceramic tube, and an inner surface of each of the brazing rings is disposed to extend toward the inside of the ceramic tube to a portion farther inward than an inner edge of the ceramic tube.

6. The resistor according to claim 5, wherein each of the brazing rings comprises an outer portion joined to the ceramic tube and an inner portion joined to an end portion of the resistive element.

7. The resistor according to claim 4, further comprising brazing members melted between the contact portion and each of the terminal electrodes to join the contact portion to each of the terminal electrodes.

8. The resistor according to claim 7, further comprising a plating layer comprising nickel (Ni) or titanium (Ti) disposed on at least one selected from the group consisting of the contact portion, the junction portion, and each of the terminal electrodes to improve joining strength by melting of the brazing rings or the brazing members.

9. The resistor according to claim 1, wherein a space between the sealed ceramic tube and the resistive element is filled with an inert gas.

10. A method of manufacturing a resistor comprising a ceramic tube accommodating a resistive element, first and second sealing electrodes disposed at both ends of the ceramic tube to be connected to the resistive element, and first and second brazing rings joining the ceramic tube to each of the sealing electrodes, the method comprising:
preparing the first sealing electrode;
sequentially stacking the first brazing ring and the ceramic tube on the first sealing electrode;
inserting the resistive element into the ceramic tube;
sequentially stacking the second brazing ring and the second sealing electrode on the ceramic tube; and
sealing between the ceramic tube and each of the first and second sealing electrodes by placing a resultant structure in a chamber and melting the first and second brazing rings.

11. The method according to claim 10, wherein:
each of the first and second sealing electrodes comprises a contact portion protruding toward the inside of the ceramic tube to be inserted into the ceramic tube and contact the resistive element and a junction portion joined to each of the first and second brazing rings; and
each of the first and second brazing rings is inserted to the junction portion of each of the first and second sealing electrodes.

12. The method according to claim 11, wherein a plating layer comprising nickel (Ni) or titanium (Ti) is further disposed on the surface of the junction portion to improve joining strength by melting of the first and second brazing rings.

13. The method according to claim 10, wherein:
the first and second brazing rings are formed of $Ag_{25}CuZnSn$, an alloy comprising silver (Ag), copper (Cu), zinc (Zn), and tin (Sn); and
the sealing is performed by melting the first and second brazing rings at a temperature of 500 to 850° C.

* * * * *